(12) United States Patent
Stokking et al.

(10) Patent No.: US 8,775,683 B2
(45) Date of Patent: Jul. 8, 2014

(54) EXCHANGING CONTROL CODES BETWEEN SIP/IMS AND UPNP NETWORK ELEMENTS

(75) Inventors: Hans Maarten Stokking, Den Haag (NL); Fabian Arthur Walraven, Groningen (NL); Frank Theodoor Henk Den Hartog, Zoeterwoude (NL); Yetao Zhu, Delft (NL)

(73) Assignee: Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 868 days.

(21) Appl. No.: 12/743,222

(22) PCT Filed: Nov. 17, 2008

(86) PCT No.: PCT/NL2008/050729
§ 371 (c)(1),
(2), (4) Date: Jul. 28, 2010

(87) PCT Pub. No.: WO2009/064188
PCT Pub. Date: May 22, 2009

(65) Prior Publication Data
US 2010/0293299 A1    Nov. 18, 2010

(30) Foreign Application Priority Data

Nov. 16, 2007    (EP) .................................... 07120851

(51) Int. Cl.
*G06F 15/16*    (2006.01)

(52) U.S. Cl.
USPC ........................................................ 709/249

(58) Field of Classification Search
USPC ........................................................ 709/249
See application file for complete search history.

(56) References Cited

U.S. PATENT DOCUMENTS 8,112,523 B2 *   2/2012   Van Elburg et al. .......... 709/225
2006/0140199 A1  6/2006   Ma et al.
2008/0310435 A1* 12/2008  Cagenius et al. ............. 370/401
2009/0215453 A1* 8/2009   Blanco Blanco et al. .. 455/435.1
2010/0217877 A1* 8/2010   Willars et al. ................ 709/228

FOREIGN PATENT DOCUMENTS

WO    WO-2007/061345    5/2007
WO    WO-2007/071282    6/2007

OTHER PUBLICATIONS

The Session Initiation Protocol (SIP) P-Profile-Key Private Header (P-Header), Aug. 2007, Author: G. Camarillo, G. Blanco, Category: Informational, Ericsson.*

(Continued)

*Primary Examiner* — Kevin Bates
*Assistant Examiner* — S M Rahman
(74) *Attorney, Agent, or Firm* — Morrison & Foerster LLP

(57) ABSTRACT

Method for exchanging control codes between a SIP (Session Initiation Protocol) enabled first network element (1) of an IMS (IP Multimedia Subsystem) network (2), e.g. a mobile terminal connected to such network, and a UPnP (Universal Plug and Play) enabled second network element (3) of a UPnP enabled network (4), both networks being interconnected by an IMS/UPnP interface (5). The first network element (1) addresses a request to a SIP/SIP interface (6), using an address which conforms to the Wildcard PSI (Public Service Identity) format and comprising a PSI address part A which is valid for PSI addressing, and a wildcard address part A'. Then the PSI address part A is converted, in the SIP/SIP interface (6), into a valid SIP URI (Universal Resource Identifier) address B assigned to die IMS/UPnP interface (5), while the wildcard address part A1 is converted into an address parameter B1, pointing or assigned to the second network element of the UPnP enabled network. Next, in the IMS/UPnP interface (5) the URI parameter B' is converted into a corresponding UPnP address (C). Finally, SIP based and UPnP based control codes (CTRSIP,CTRUPP) are converted and exchanged back and/or forth between the SIP enabled first network element (1) and the UPnP enabled second network element (3).

10 Claims, 11 Drawing Sheets

(56) References Cited

OTHER PUBLICATIONS

International Search Report for PCT/NL2008/050729, mailed on Jun. 4, 2009, 3 pages.

Kumar and Rahman, IEEE CCNC 2006 Proceedings (2006) 2:788-792.

Moyer et al., "Framework Draft for Networked Appliances using the Session Initiated Protocol" Internet Engineering Task Force, IETF Standard Working Draft, Jun. 1, 2001.

\* cited by examiner

EXCHANGING CONTROL CODES BETWEEN SIP/IMS AND UPNP NETWORK ELEMENTS

CROSS-REFERENCE TO RELATED APPLICATIONS

This application is the national phase of PCT application PCT/NL2008/050729 having an international filing date of 17 Nov. 2008, which claims benefit of European application No. 07120851.6 filed 16 Nov. 2007. The contents of the above patent applications are incorporated by reference herein in their entirety.

FIELD OF THE INVENTION

The invention relates to a method for exchanging control codes between a SIP (Session Initiation Protocol) enabled first network element of an IMS (IP Multimedia Subsystem) network, e.g. a mobile terminal connected to such network, and a UPnP (Universal Plug and Play) enabled second network element of a UPnP enabled network, both networks being interconnected by an IMS/UPnP interface.

BACKGROUND

The Session Initiation Protocol (SIP) is an application-layer control (signaling) protocol for creating, modifying, and terminating sessions with one or more participants. These sessions include Internet telephone calls, multimedia distribution, and multimedia conferences. SIP has been accepted as a 3GPP signaling protocol and is a permanent element of the IMS architecture. It is widely used as a signaling protocol for Voice over IP, along with H.323 and others. SIP is addressing neutral, with addresses expressed as URL/URIs of various types, such as e.g. telephone numbers, email addresses etc.

The IP Multimedia Subsystem (IMS) is a standardised Next Generation Networking (NGN) architecture for telecom operators that want to provide mobile and fixed multimedia services. It uses a multimedia signaling based on a standardised implementation of SIP, and runs over the standard Internet Protocol (IP). Existing phone systems (both packet-switched and circuit-switched) are supported.

Universal Plug and Play (UPnP) is a set of computer network protocols promulgated by the UPnP Forum. The goals of UPnP are to allow devices to connect seamlessly and to simplify the implementation of networks in the home (data sharing, communications, and entertainment) and corporate environments. UPnP achieves this by defining and publishing UPnP device control protocols built upon open, Internet-based communication standards. UPnP thus is a protocol for in-house/in-office networks, providing that devices are able to find each other and communicate with each other. UPnP, which is IP based, is very fit for interconnecting e.g. media players, TV's, printers, scanners, electric switches, dimmers, home automation devices etc. Some of the UPnP enabled devices could be remotely operated or set (e.g. the heating) via e.g. the Internet or another external network.

It is desirable to enable remote access to UPnP devices/services from a SIP device, e.g. a SIP/IMS based mobile terminal, via a SIP-UPnP gateway function.

Several prior art solutions have been proposed in the past, e.g.

Using SIP for building a UPnP Remote Access Tunnel;
Using SIP Message Services for transportation of UPnP messages (see WO 2006071468);
Using SIP for bridging to UPnP networks (WO/2007/002242).

These prior art solutions for remote access to UPnP devices/services, disadvantageously, all require any adaptation of the SIP terminal to be used for remote access.

The document "Framework Draft for Networked Appliances using the Session Initiation Protocol" by S. Moyer et al., Internet Engineering Task Force Internet Draft, 2001, discloses the use of SIP for network-capable appliances.

Furthermore, different solutions for addressing the network elements for bridging SIP control messages to UPnP messages are available. Every UPnP address can be mapped on a SIP URI address. This solution is a very straightforward solution, but it requires one of the following two configurations:

1. All the SIP URI addresses are configured in the public network domain in the different SIP elements. Because UPnP devices can be dynamically added or removed from the UPnP network, this requires dynamic addition/removal of SIP URI addresses in the public network domain. Such a dynamic process does not exist and brings with it a lot of complexity for the SIP/IMS network domain administrator. Therefore, this is not a practical solution.
2. The UPnP domain has its own SIP address domain, e.g. UPnPbridgel.com. Each separate UPnP address is part of the address domain, e.g. UPnPdevicel@UPnPbridgel.com. While this certainly is a technically feasible solution, this requires that all UPnP/SIP bridges to be connected to the SIP network have to use a Network to Network Interface (NNI). This also brings a lot of complexity for the SIP/IMS network domain administrator, and is therefore not a practical solution The prior art configurations require special/additional UPnP functionality to be installed in or added to the SIP terminal.

It is desirable to provide for a method and/or means aiming to enable standard (e.g. mobile) SIP terminals to be used to access and control UPnP devices and services via the SIP/IMS network.

Moreover, it may be desirable that dynamic configuration of SIP addresses in the SIP network or NNI-based interconnection of SIP/UPnP bridges with the SIP network are not required.

SUMMARY

A method is provided for exchanging control codes between a SIP enabled first network element of an IMS network e.g. a mobile terminal connected to such network, and a UPnP enabled second network element of a UPnP enabled network, both networks being interconnected by an IMS/UPnP interface, the method comprising the steps of:

the first network element addressing a request to an SIP/SIP interface, using an address which conforms to the Wildcard PSI (Public Service Identity) format and comprises a PSI address part A which is valid for PSI addressing, and a wildcard address part A';

the SIP/SIP interface converting the PSI address part A into a valid SIP URI address B assigned to the IMS/UPnP interface, while converting the wildcard address part A' into an address parameter B' pointing or assigned to the second network element of the UPnP enabled network;

the IMS/UPnP interface converting the URI parameter B' into a corresponding UPnP address; and converting SIP based and UPnP based control codes and exchange back and/or forth said control codes between the SIP enabled first network element and the UPnP enabled second network element.

PSIs (Public Service Identities) are SIP URIs (URI=Universal Resource Identifier, i.e. a character string identifying and locating any type of resource on the Internet) that refer to services instead of users. In an embodiment an example of a wildcarded PSI address may be sip:.myhome!.*!@ims.telecom.tno.nl. This wildcarded PSI addresses matches examples of PSI addresses like sip:myhome-15263@ims.telecom.tno.nl and similar addresses with other content instead of 15263, as indicated by a wildcard symbol in the wildcarded address. In this example myhome may be the address part A and 15263 may be the wildcard address part.

An example of a converted SIP URI address part B in this embodiment is sip:myhome@ims.telecom.tno.nl and an example of a converted wildcard address part B' may be upnp=15263, which may be added to the SIP URI address by means of using the SIP URI parameter capability. This results in an address sip:myhome@ims.telecom.tno.nl; upnp=15263. However, the converted address parameter may, instead of being converted to a URI parameter, be added to the SIP URI address, be written into the body part of a SIP message or be used in a new SIP header.

The Wildcard PSI format may be used in the request by the first network element, because this first network element can save this Wildcard PSI format as part of its directory system. This directory system contains addresses of known other network elements and can include information on the current status of such network elements ("presence information"). According to IMS specifications, Wildcard PSI can be part of such a directory, whereas an URI parameter as used in the next step cannot be part of such a directory.

The address parameter B' in the conversion is used to control the IMS/UPnP interface, because the Wildcard PSI cannot be used there according to the IMS specifications: a Wildcard PSI can only be used to address specific types of network elements. An example of a SIP/SIP interface is a so-called SIP Back-to-Back User Agent.

There are various implementations for converting the wildcard address part A' into the relevant address parameter B' pointing to or assigned to the second network element of the UPnP enabled network. Three alternatives are equally preferred. In one preferred implementation the address parameter B' is converted into a URI parameter which is added to the SIP URI address. In a second preferred implementation the address parameter B' is converted into the value of a new SIP header. In a third preferred implementation the address parameter B' is converted into the value of a new SIP header.

It is noted that the technical and commercial area of home networks is quite different from the (service providers) area of SIP based telecommunication networks. Thus both quite different "worlds" are combined, however without tunneling and without any need to adapt/amend existing components in either "world".

Innovations which may be enabled by this comprise:
Extra functions of the home gateway;
Extra functions in de operator domain/IMS network.

An advantage for the end user is that, for getting access to the home network, the user is not required to use a mobile terminal having an (extra) special UPnP functionality. An advantage for the operator (an application for the benefit of its customers) is that the company-customer relationship is supported: a customer will have an extra incentive to purchase mobile telephony services and Internet service from the same service provider, in order to be able to enjoy the advantages.

The described embodiments may be of interest for:
Telecom operators offering mobile and fixed Internet services;
Suppliers of home gateways;—As a contribution to the Home Gateway Initiative (HGI), which is an open forum launched by a number of telecom operators with the aim to release specifications of die home gateway. In addition to Telco's, several manufacturers have joined the alliance. The HGI is a place where operators, content providers, service providers and manufacturers will discuss home gateway key specifications and standards.

Further an interface and a device are provided configured for performing and/or controlling a method as defined above.

Additionally a software program product is provided configured for performing and/or controlling a method and/or device as defined above.

The software program product may comprise a set of computer executable instructions stored on a data carrier, such as a CD or a DVD. The set of computer executable instructions, which allows a programmable computer to carry out the method defined above, may also be available for downloading from a remote server, for example via the Internet.

BRIEF DESCRIPTION OF THE DRAWING

Below the exemplary embodiments will be elucidated with reference to some figures, which schematically outline an exemplary embodiment of a system which is suitable for performing the method.

DETAILED DESCRIPTION OF EXEMPLARY EMBODIMENTS

Figure 1:
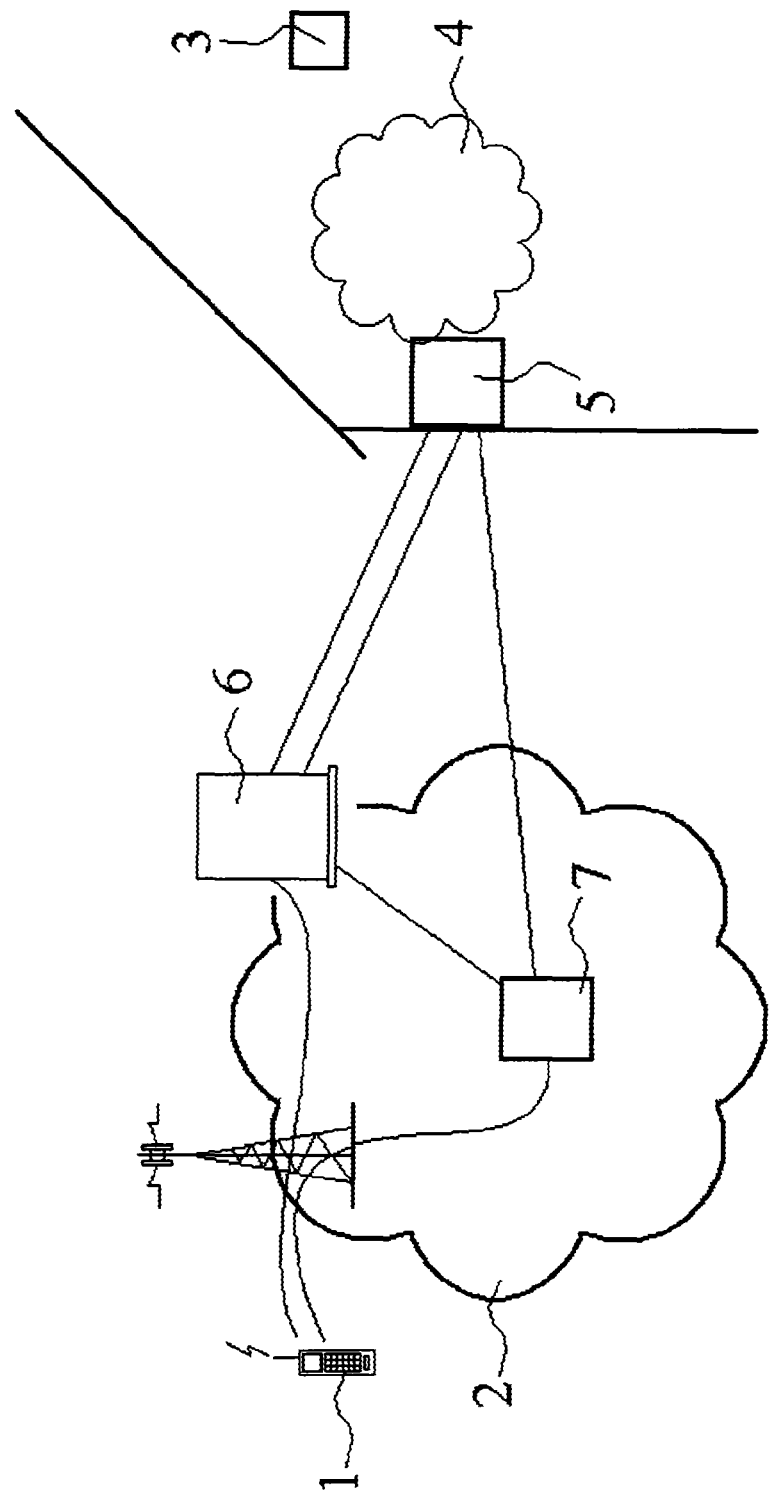
FIG. 1 shows an exemplary architecture.

The exemplary system configuration of FIG. 1 shows a SIP enabled first network element 1 of an IMS (IP Multimedia Subsystem) network 2—e.g. a mobile terminal 1 connected to such network 2—and a UPnP enabled second network element 3 of a UPnP enabled network 4, both networks being interconnected by an IMS/UPnP interface or gateway 5. Moreover, a SIP/SIP interface 6 has been provided.

To perform a SIP/UPnP control action the first network element 1 addresses a request to the SIP/SIP interface 6, using an address which conforms to the Wildcard PSI (Public Service Identity) format and comprising a PSI address part called part A which is valid for PSI addressing, and a wildcard address part called part A'.

PSIs (Public Service Identities) are SIP URIs (URI=Universal Resource Identifier, i.e. a character string identifying and locating any type of resource on the Internet) that refer to services instead of users. That is, they address and/or route to operator network entities, like e.g. Application Servers like the SIP/SIP Interface 6, but not end-user devices. Wildcarded PSIs are PSIs that match a regular expression and share die same profile.

For example, the PSIs "sip:myhome-15263@ims.telecom.tno.nl" and "sipanyhome-15625@ims.telecom.tno.nl"

would match the wildcarded PSI "sip:.myhome-!.*!@ims.telecom.tno.nl". In this example "myhome" is part A, while wildcard part A' is "15263" or "15625" respectively, which e.g. indicate two devices (labeled device 15263 and device 15625 respectively) connected to or residing within the UPnP home network 4 ("myhome").

Then the PSI address part A is converted, in the SIP/SIP interface 6, into a valid SIP URI address B (e.g. "sip: myhome@ims.telecom.tno.nl") assigned to the IMS/UPnP interface 5, while the wildcard address part A' is e.g. converted into a URI parameter B' (e.g. "upnp=15263") which is added to the SIP URI address by means of using the SIP URI parameter capability: "sip:myhome@ims.telecom.tno.nl; upnp=15263". As stated before, the address parameter B' may, instead of being converted to a URI parameter, be added to the SIP URI address, be written into the body part of a SIP message or be used in a new SIP header.

Next, in the IMS/UPnP interface 5 the URI parameter or the address written into the body part or put into the SIP header (B'="upnp=15263") is converted into a corresponding UPnP address C. Such a UPnP address is a composite address containing a HOST part, including a port of control and a path of control, as is specified in the UPnP Device Architecture. An example UPnP message uses HTTP protocol over TCP protocol and would start with:

POST path of control URL HTTP/1.1
HOST:host of control URL:port of control URL

As a result of this SIP based and UPnP based control codes (CTRSIP, CTRUPP) can be converted and exchanged back and/or forth between the SIP enabled first network element 1 and the UPnP enabled second network element 3.

Examples of ways for transporting these control codes are outlined in the following.

A SIP based control code can be the body part of a SIP MESSAGE or a SIP SERVICE. This body part can be of a specific MIME type or can be text-based. Currently there is no known specification standard what these control codes will look like. These control codes based on SIP MESSAGE or SIP SERVICE are already known from the art. A SIP based control code can be in the form of a SIP INVITE, which is used for setting up media sessions between different network elements. Examples of media sessions between elements in the UPnP domain are the streaming of audio and video traffic between a media server and a media renderer or the streaming of video traffic from a security camera.

The SIP based control code is not further specified here, but could range from simple text-based control codes like "light on" to complex ASN.1 codes.

Mapping a Wildcard PSI parameter to (e.g.) SIP URI parameter to a UPnP address is performed. Therefore two mapping relations may be maintained, viz.

From Wildcard PSI to SIP URI parameter at the SIP/SIP interface
From SIP URI parameter to UPnP address at the SIP/UPnP interface SIP/SIP interface 6 may be implemented using a programmable computer programmed with software modules that define an input for receiving the address and a converter to perform the conversions. IMS/UPnP interface 5 may be implemented using a programmable computer programmed with software modules that define a converter to perform the conversions. A programmable computer may be provided, having software modules to receive and transmit control codes from and to the SIP enabled first network element 1 and the UPnP enabled second network element 3.

The mapping relations can e.g. be stored in a memory or made persistent into some kind of storage medium, for example in a computer. The question remains how these relations will created. This can be done dynamically when introducing a new UPnP device and service. This can be part of the functionality present at the IMS/UPnP Interface. This discovery and mapping of parameters consists of the following steps:

The IMS/UPnP Interface contains a UPnP Discovery module. When a new UPnP device is introduced into the UPnP network, it sends a multicast message for discovery purposes. The UPnP Discovery module of the IMS/UPnP Interface will monitor such messages and thus discover the new UPnP device, Then the IMS/UPnP Interface uses a selection module to select a new SIP parameter to which the UPnP address of this new UPnP device should be mapped. Some mechanism may be used to ensure that this SIP parameter is unique for this IMS/UPnP Interface, e.g. using a counter and checking the currently stored mappings for counters already used and then using the next higher number.

After this SIP parameter is selected, the mapping from SIP parameter to UPnP address is stored in memory at the IMS/UPnP Interface.

Then this new UPnP device is made known to the SIP/SIP interface. This is done by a module at the IMS/UPnP interface that sends a message to the SIP/SIP interface which includes the selected SIP parameter for the new device.

A module in the SIP/SIP interface then selects a new Wildcard PSI parameter which is mapped on this SIP parameter. This new Wildcard PSI parameter should also be unique for use with the SIP address of the IMS/UPnP interface. This can be achieved by basing the new Wildcard PSI parameter on the SIP parameter (which is already unique for this reason) or using some other mechanism to ensure uniqueness.

The mapping of this new Wildcard PSI parameter to this SIP parameter is stored in memory at the SIP/SIP interface.

In this way both mappings can be created when introducing a new UPnP device in the UPnP network. In another example it can be the IMS/UPnP interface that initiates this procedure. Instead of a UPnP device sending a multicast message, the IMS/UPnP interface can sent a multicast discovery message on the UPnP network, requesting available UPnP devices to respond. Both methods (device sending multicast messages or IMS/UPnP interface sending multicast messages for discovery) are supported by the UPnP specifications.

Figure 2:
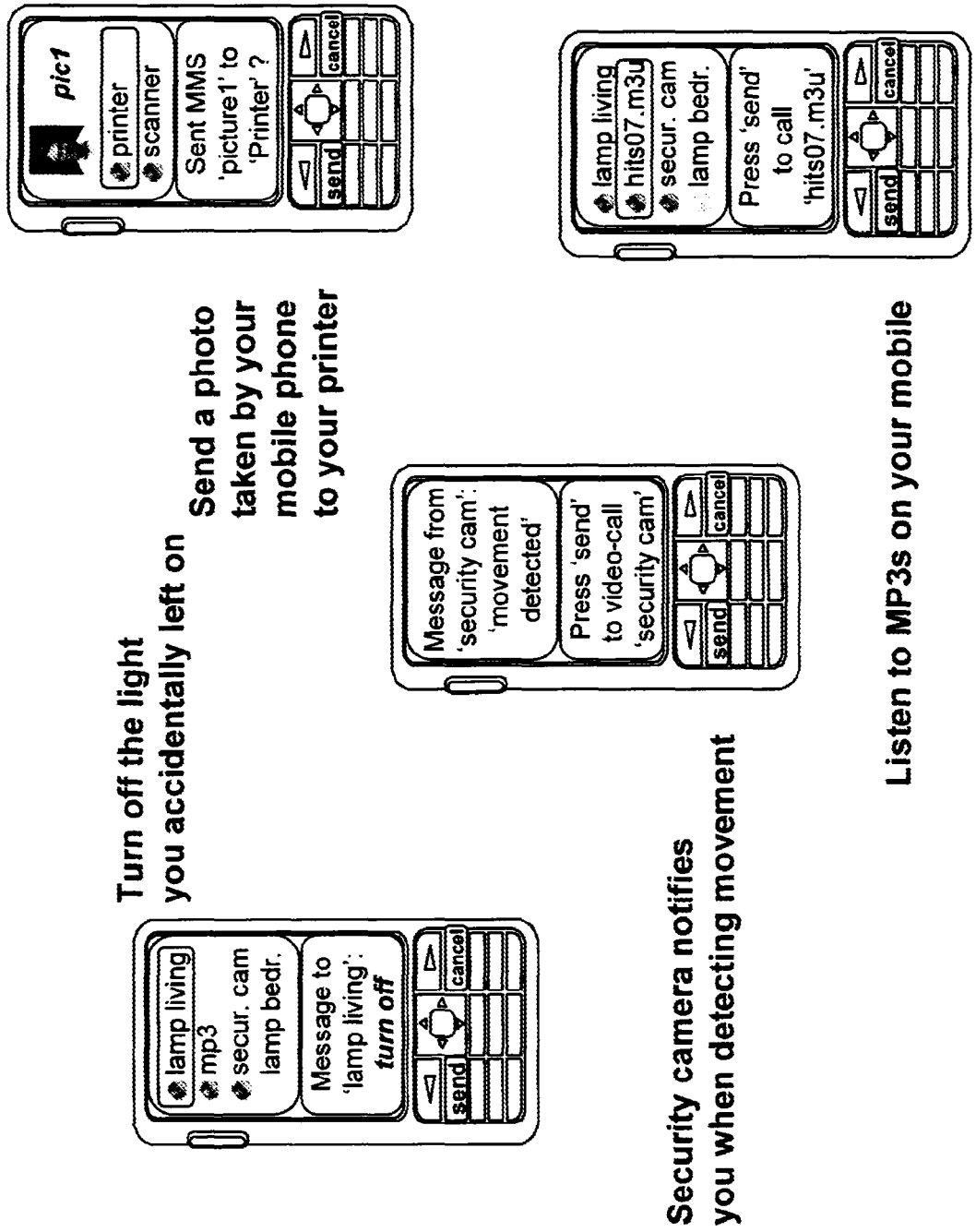
FIG. 2 illustrates some usages examples of the terminal.

FIG. 2 illustrates some usages examples of the terminal in combinations with the system as outlined in FIG. 1 and discussed in the preceding.

Figure 3:
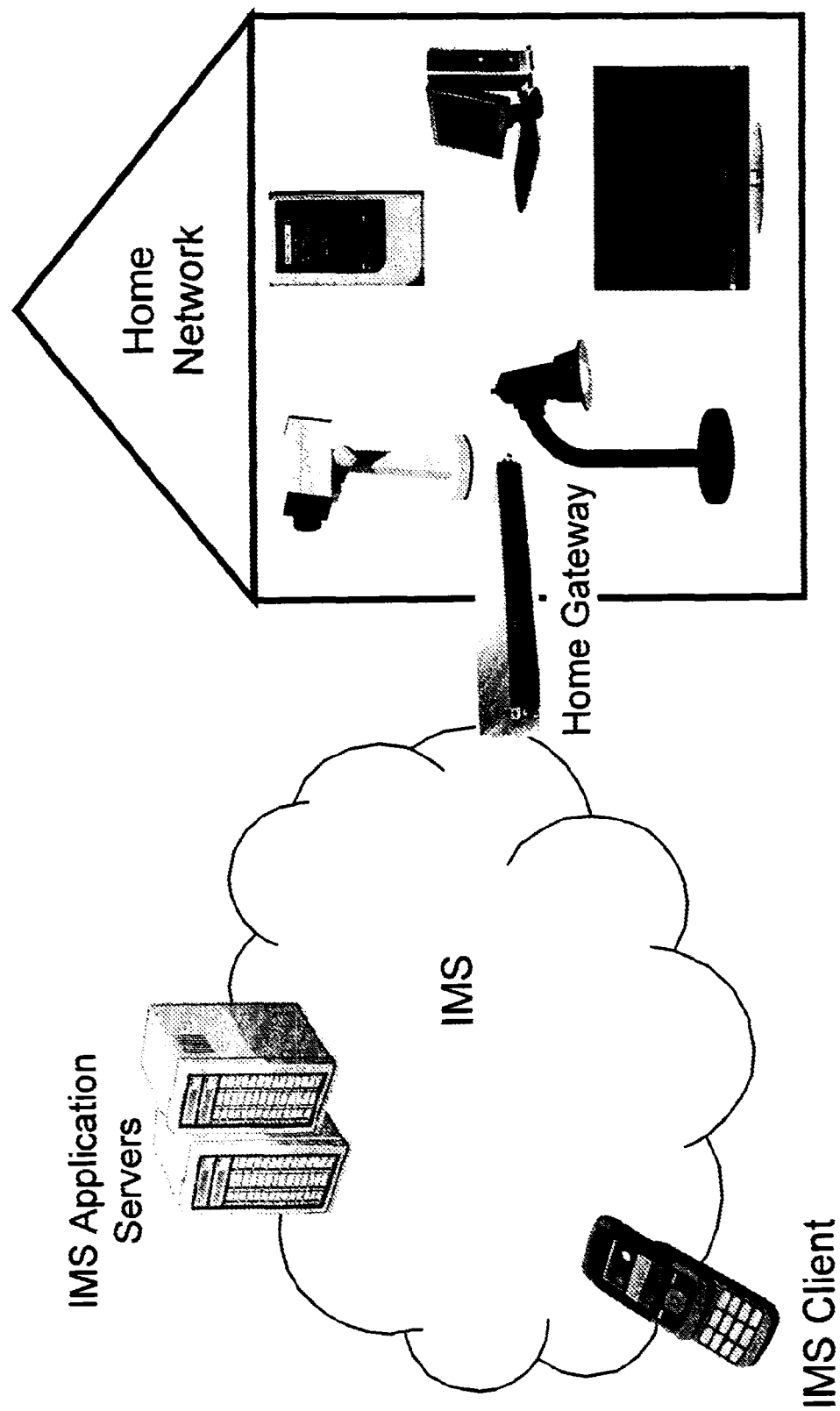
FIG. 3 shows an architecture for IMS-UPnP bridging which mainly corresponds with FIG. 1, however given in a somewhat other fashion.

FIG. 3 shows the architecture for IMS-UPnP bridging which corresponds with FIG. 1, however given in a somewhat other fashion, more adapted to the fashion of FIGS. 4-9.

Figure 4:
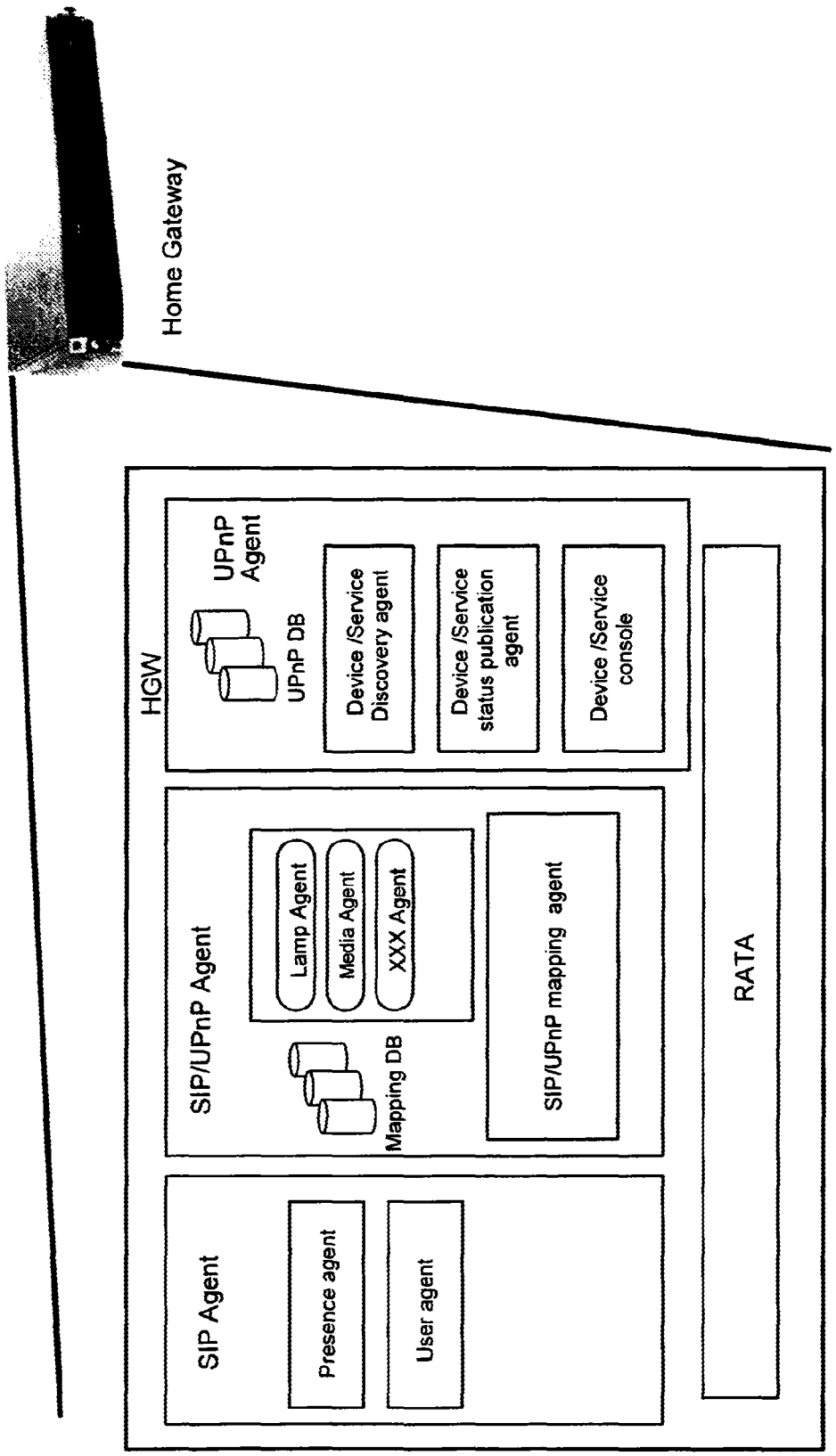
FIG. 4 shows an exemplary block diagram of a preferred Home Gateway.

FIG. 4 shows a HG (Home Gateway) block diagram of the architecture.

Figure 5:
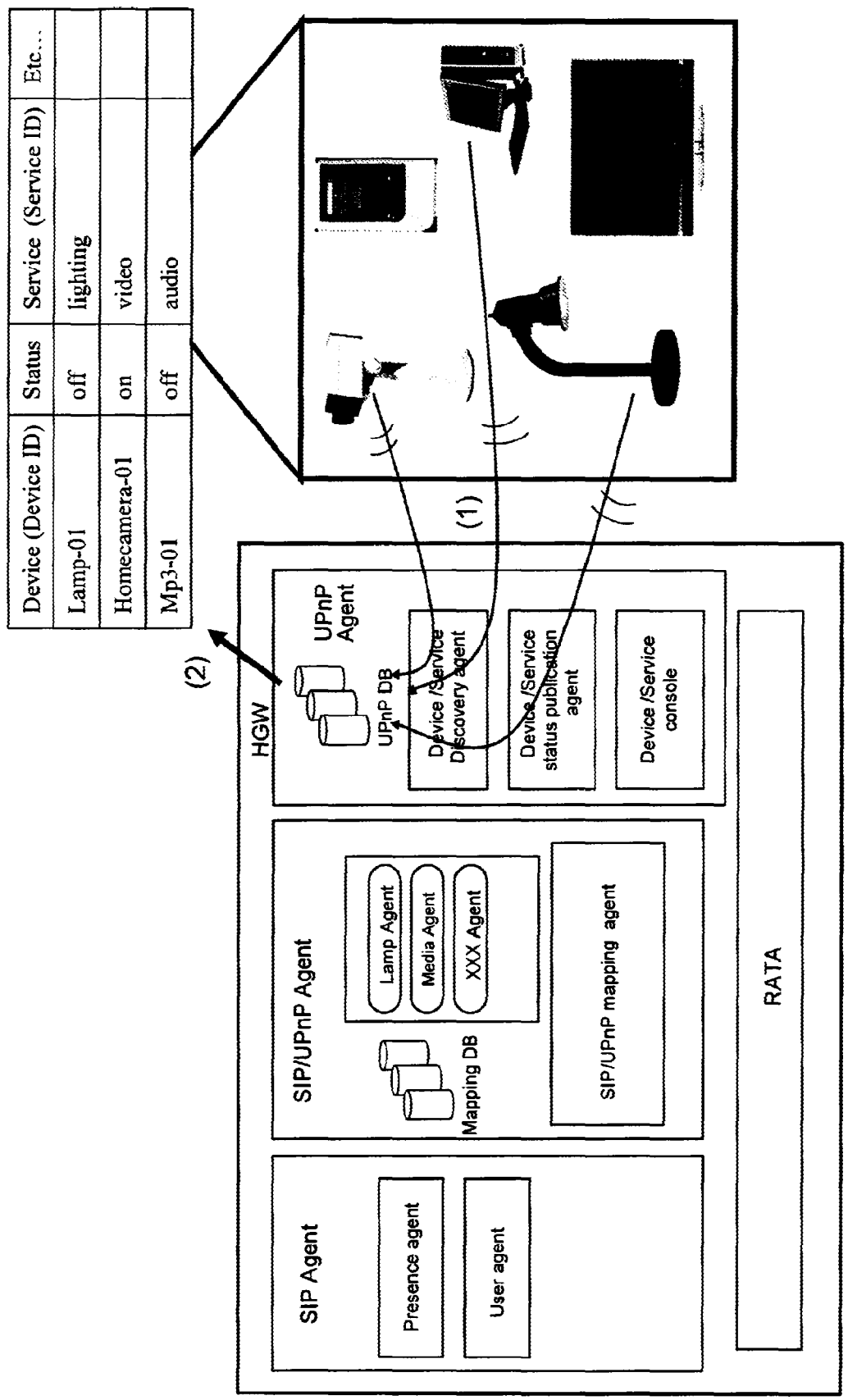
FIGS. 5-9 show illustrations of several exemplary processing steps.

FIG. 5 illustrates two steps which comprise UPnP Device/Service discovery:
1. Home devices announce their presence/status via UPnP multicast.
2. HG collects the device/service information in the database.

Figure 6:
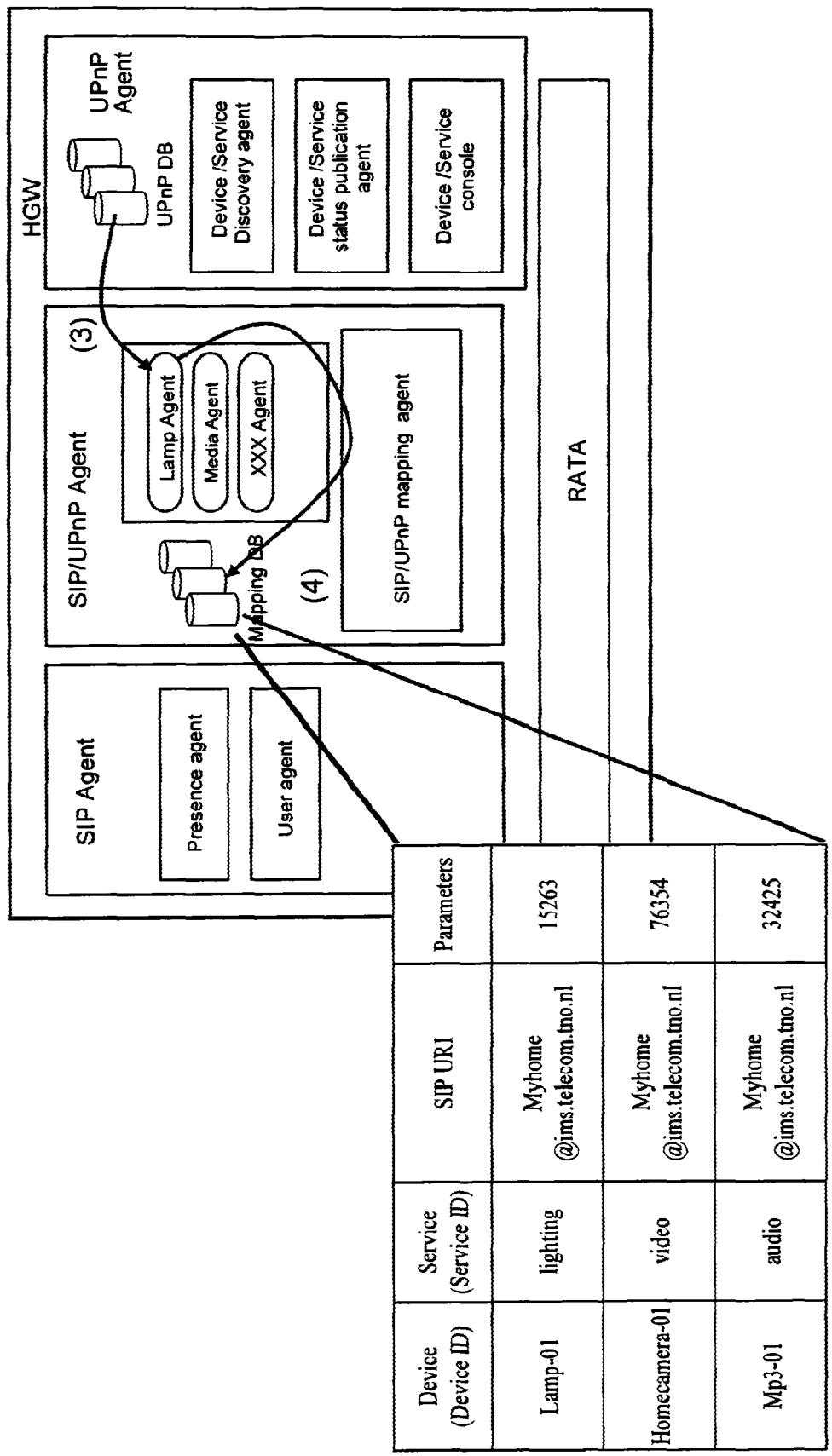

FIG. 6 illustrates two steps which comprise Mapping via SIP URI parameters:
3. The UPnP agent forwards the information to the Lamp agent.
4. Mapping agent maps the UPnP service ID to SIP URI parameter, and backup a copy in the DB.

Figure 7:
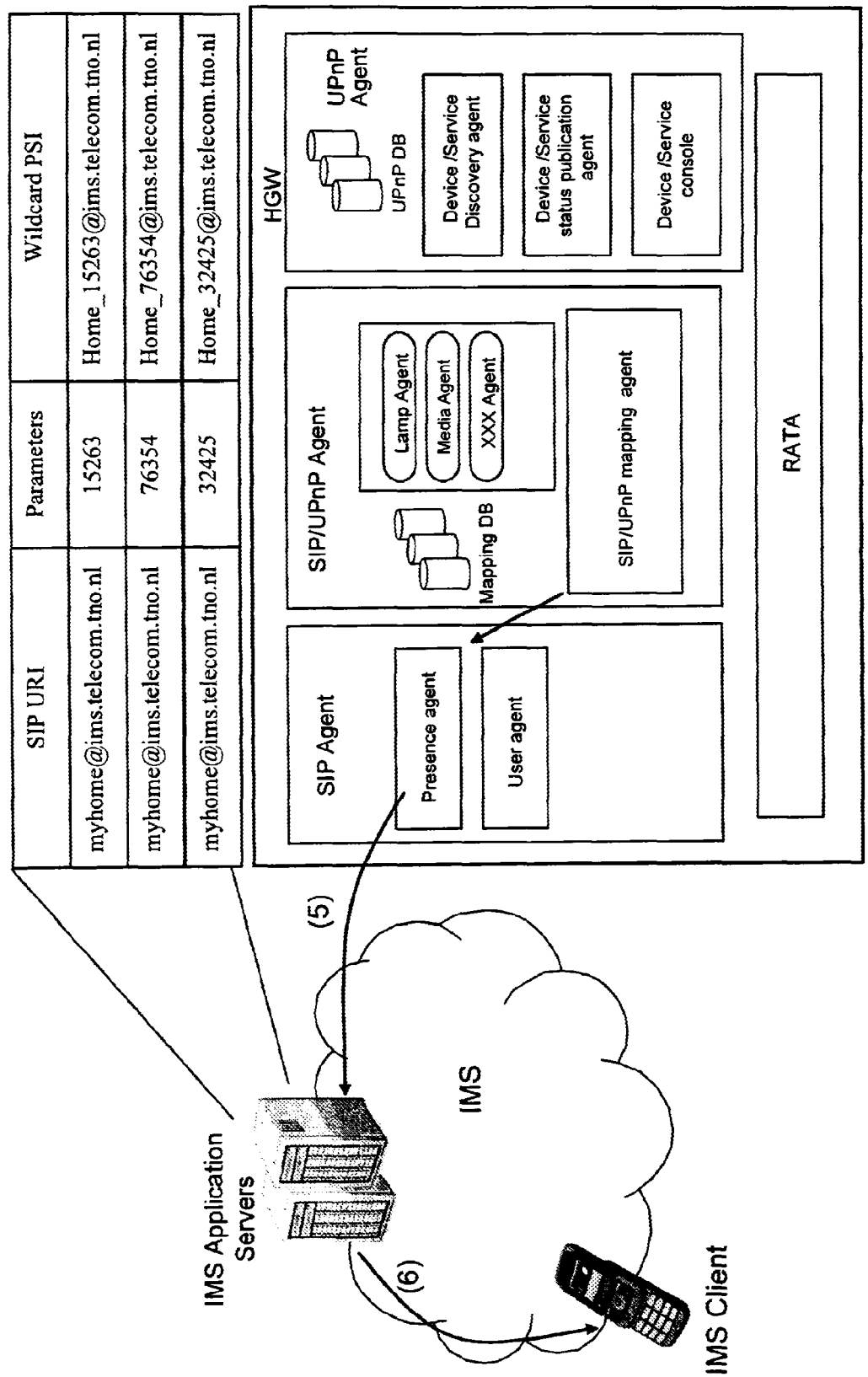

FIG. 7 illustrates two steps which comprise Mapping in the AS:
5. HG forwards the message to the AS.
6. AS does the Wildcard PSI (WPSI) mapping and pushes the information to the IMS client buddy list.

Figure 8:
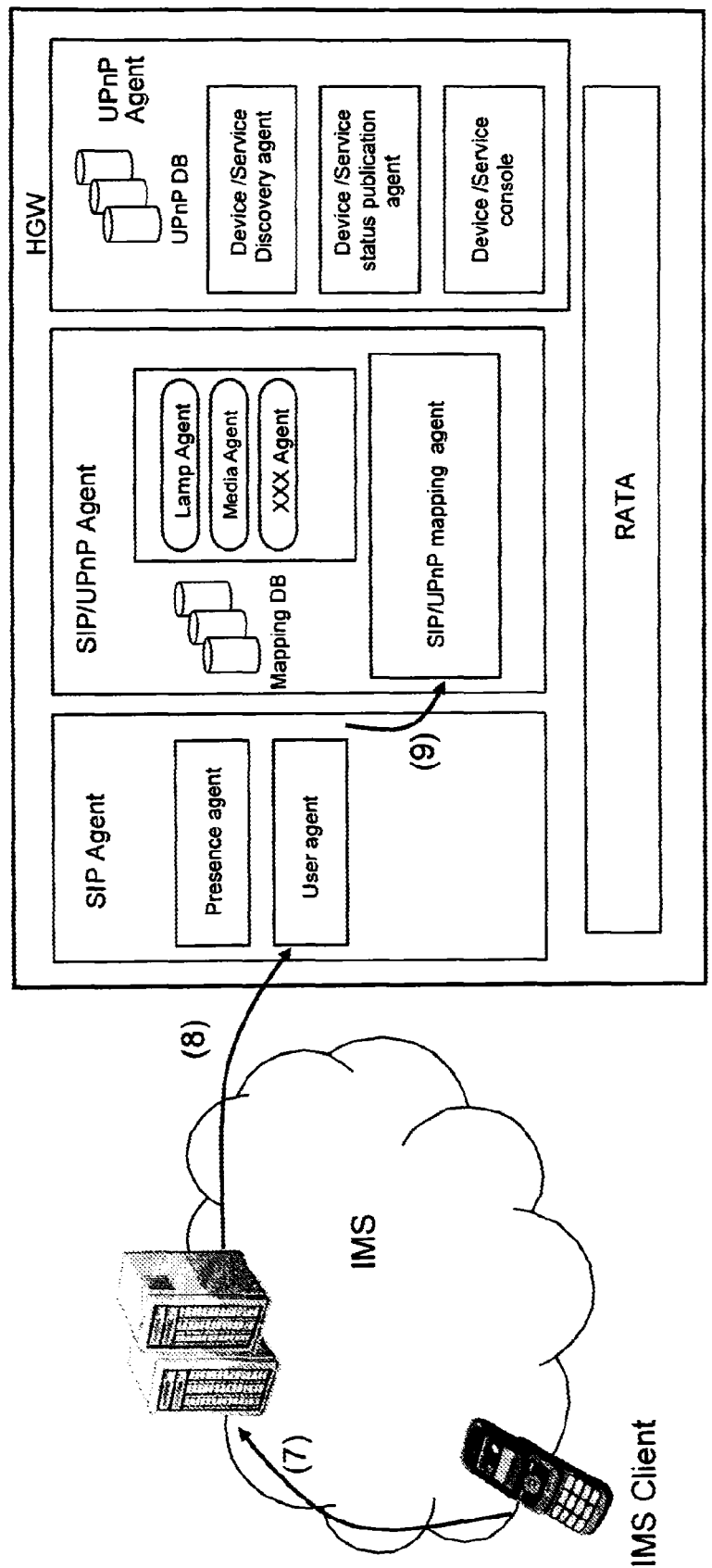

FIG. 8 illustrates three steps which comprise UPnP control by IMS client:
7. IMS client sends a command, i.e. turn on the lamp-01.
8. IMS AS maps the Wildcard PSI to the SIP URI parameters, and routes to the proper HG user agent.
9. The user agent conveys the command to the SIP/UPnP mapping agent in order to obtain the proper device/service ID.

Figure 9:
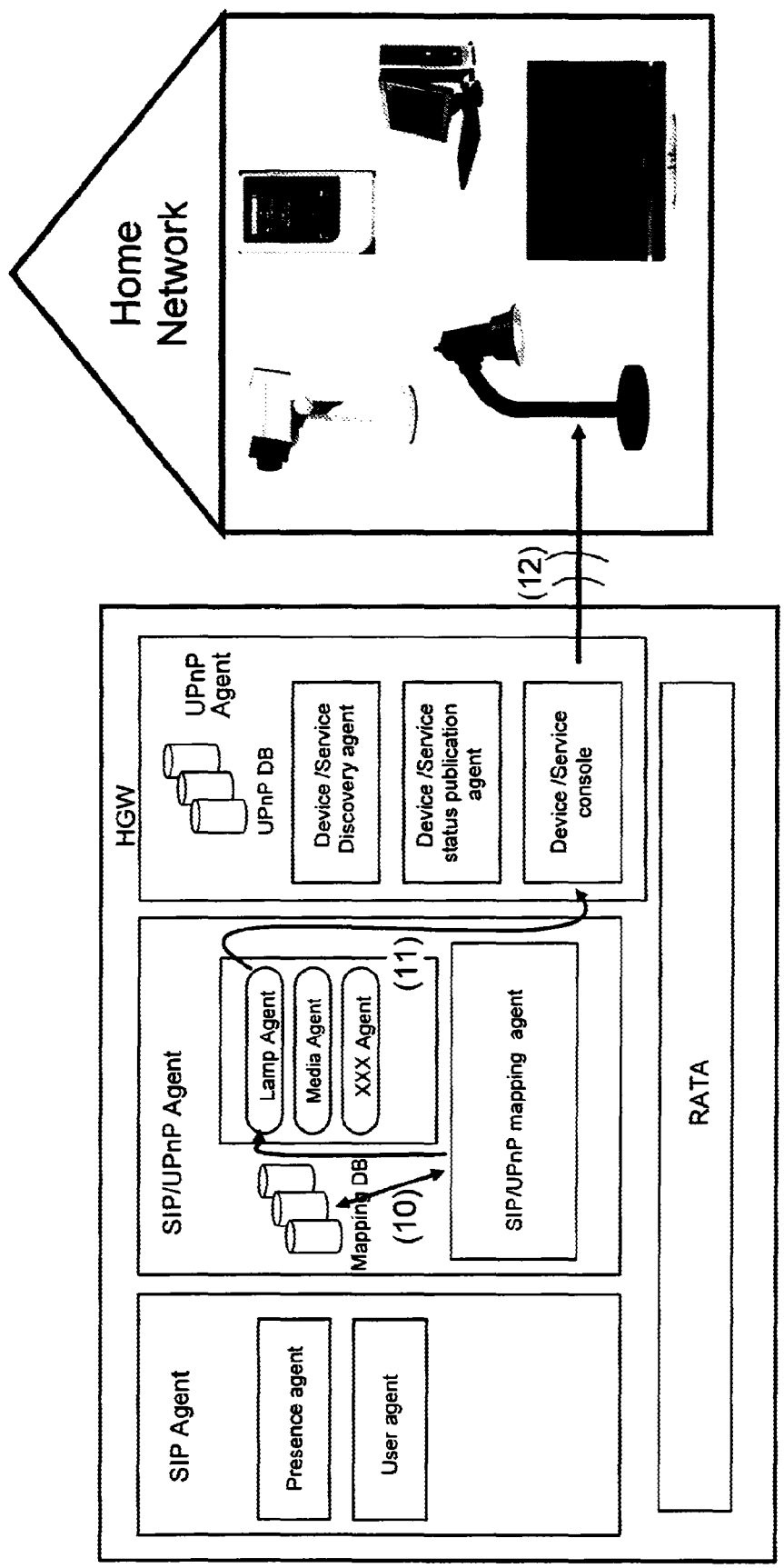

FIG. 9 illustrates three steps which comprise UPnP Device/service discovery:
10. The proper device/service ID is forwarded to the Lamp agent.
11. Lamp agent sends the command to the device/service console.
12. Device/service console executes the command by sending one or more UPnP control messages to the device.

Figure 10:
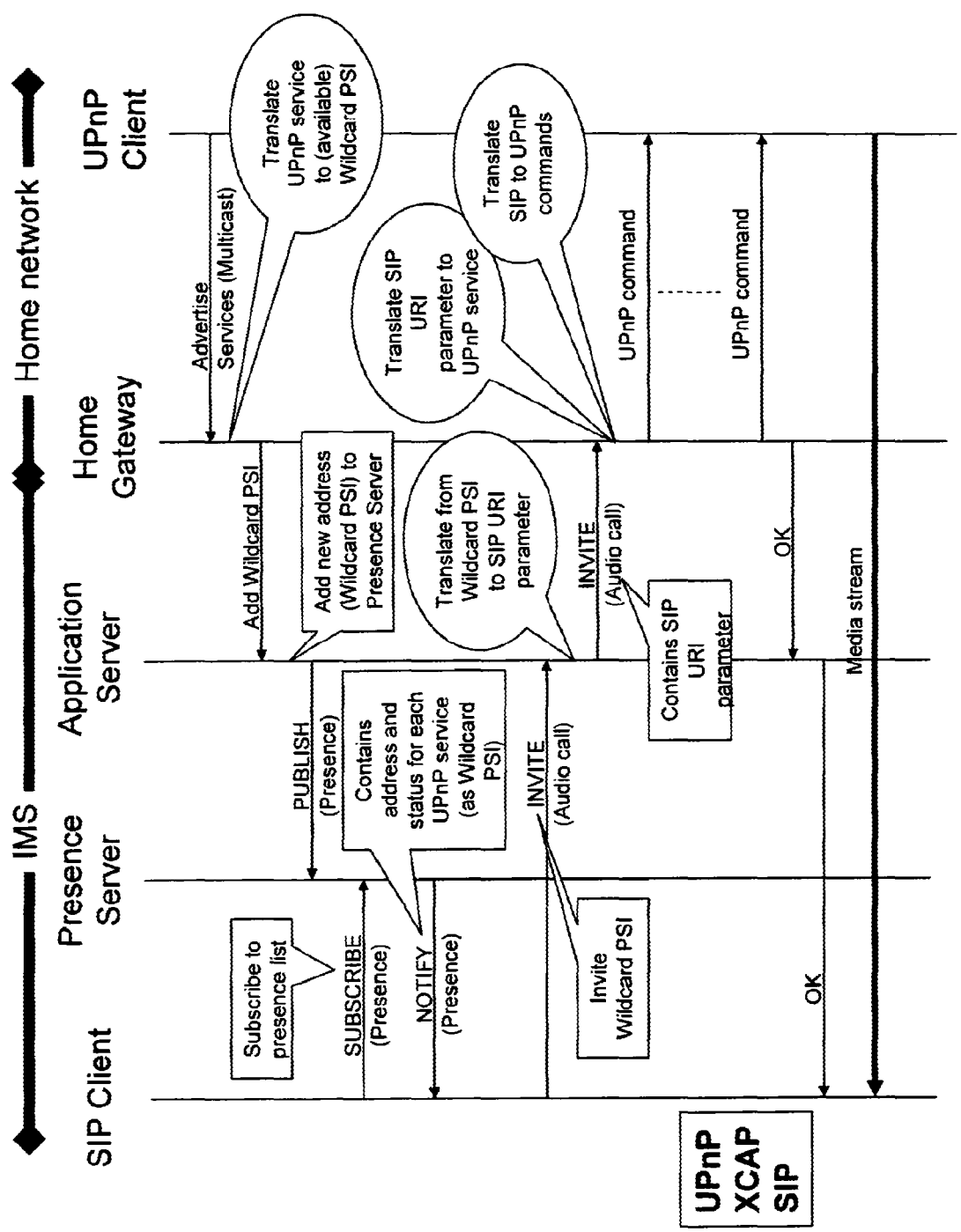
FIG. 10 shows a exemplary signals/codes/messages diagram.

FIG. 10 shows a diagram showing the signals/codes/messages which are exchanged in the embodiment outlined in the preceding. In this FIG. 10 the SIP/SIP interface 6 is represented by the Application Server, and a Presence Server is introduced to push the Wildcard PSI address to the mobile terminal.

Figure 11:
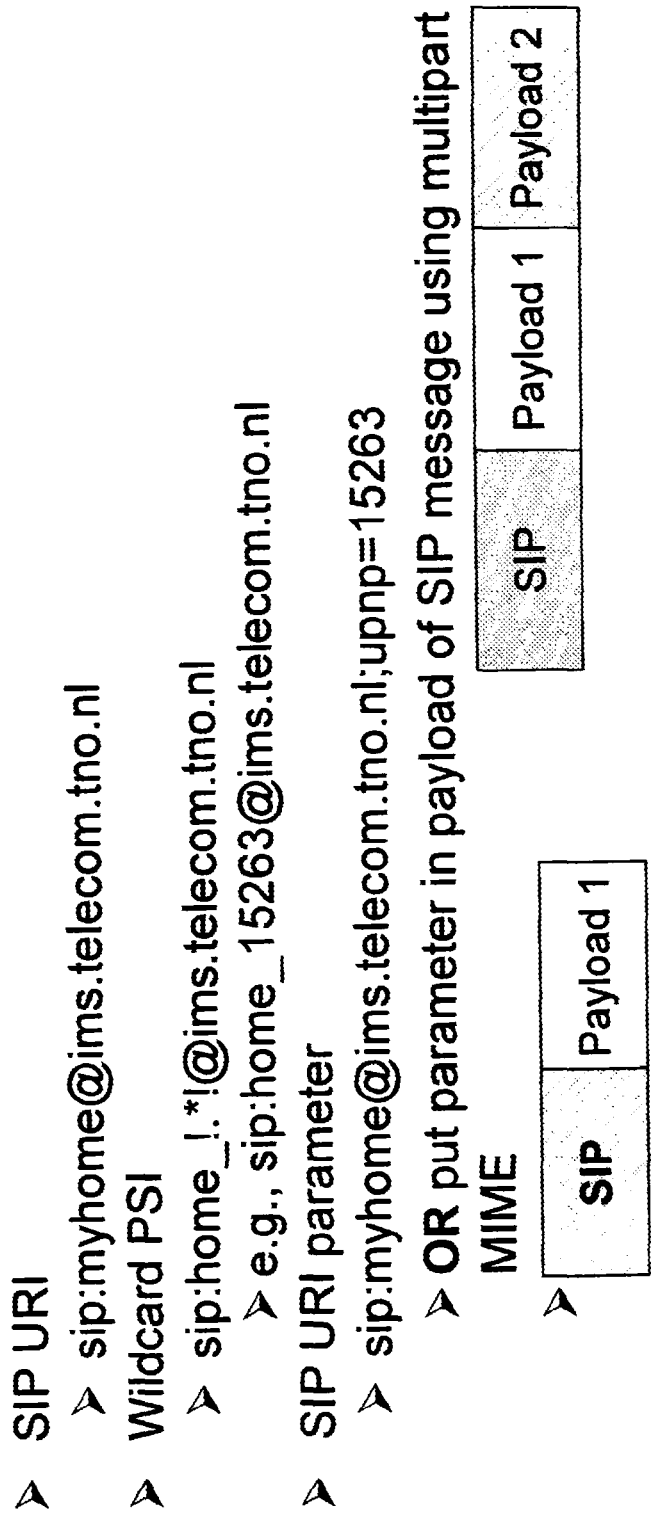
FIG. 11 shows some addressing examples.

FIG. 11 illustrates some Addressing Examples

The invention claimed is:

1. A method for exchanging control codes between a SIP enabled first network element of an IMS network and a UPnP enabled second network element of a UPnP enabled network, both networks being interconnected by an IMS/UPnP interface, the method comprising the steps of:
   the first network element addressing a request to a SIP/SIP interface, using an address which conforms to the Wildcard PSI format and comprising a PSI address part A which is valid for PSI addressing, and a wildcard address part A';
   the SIP/SIP interface converting the PSI address part A into a valid SIP URI address B assigned to the IMS/UPnP interface, while converting the wildcard address part A' into an address parameter B' pointing or assigned to the second network element of the UPnP enabled network;
   the IMS/UPnP interface converting the address parameter B' into a corresponding UPnP address; and
   converting SIP based and UPnP based control codes and exchanging back and/or forth said control codes between the SIP enabled first network element and the UPnP enabled second network element, wherein the exchanging back and/or forth makes use of the UPnP address obtained by said steps of converting by the SIP/SIP interface and the IMS/UPnP interface.

2. A method according to claim 1, wherein the address parameter B' is converted into a URI parameter which is added to the SIP URI address.

3. A method according to claim 1, wherein the address parameter B' is placed into the body part of a SIP message.

4. A method according to claim 1, wherein the address parameter B' is converted into the value of a new SIP header.

5. A method according to claim 1, wherein the SIP based control code is part of a SIP Message.

6. A method according to claim 1, wherein the SIP based control code is part of a SIP Service.

7. A method according to claim 1, wherein the SIP based control code is part of a SIP Invite.

8. A device adapted to performing and/or controlling a method according to claim 1.

9. A non-transitory software program product configured for performing and/or controlling the steps of the SIP/SIP interface and/or the IMS/UPnP interface in the method according to claim 1.

10. An interface for exchanging control codes between a SIP enabled first network element of an IMS network and a UPnP enabled second network element of a UPnP enabled network, the interface comprising:
   a SIP/SIP interface with an input for receiving a request addressed using an address which conforms to the Wildcard PSI format and comprising a PSI address part A which is valid for PSI addressing, and comprising a wildcard address part A', and a converter configured to convert the PSI address part A into a valid SIP URI address B assigned to the IMS/UPnP interface, while converting the wildcard address part A' into an address parameter B' pointing or assigned to the second network element of the UPnP enabled network;
   an IMS/UPnP interface comprising a converter configured to convert the address parameter B' into a corresponding UPnP address; and
   a converter to convert SIP based and UPnP based control codes for exchanging back and/or forth said control codes between the SIP enabled first network element and the UPnP enabled second network element, wherein the converter makes use of the UPnP address obtained by said steps of converting by the SIP/SIP interface and the IMS/UPnP interface.

* * * * *